United States Patent
Song et al.

(10) Patent No.: US 10,361,426 B2
(45) Date of Patent: Jul. 23, 2019

(54) SECONDARY GRAPHITE PARTICLE AND SECONDARY LITHIUM BATTERY COMPRISING THE SAME

(71) Applicant: LG Chem, Ltd., Seoul (KR)

(72) Inventors: Jun Hyuk Song, Daejeon (KR); Eun Kyung Kim, Daejeon (KR); Dong Sub Jung, Daejeon (KR); Sang Wook Woo, Daejeon (KR); Ye Ri Kim, Daejeon (KR); Ju Ho Chung, Daejeon (KR)

(73) Assignee: LG Chem, Ltd. (KR)

( * ) Notice: Subject to any disclaimer, the term of this patent is extended or adjusted under 35 U.S.C. 154(b) by 123 days.

(21) Appl. No.: 15/035,635

(22) PCT Filed: Jul. 27, 2015

(86) PCT No.: PCT/KR2015/007820
§ 371 (c)(1),
(2) Date: May 10, 2016

(87) PCT Pub. No.: WO2016/018023
PCT Pub. Date: Feb. 4, 2016

(65) Prior Publication Data
US 2016/0276657 A1 Sep. 22, 2016

(30) Foreign Application Priority Data

Jul. 29, 2014 (KR) .......................... 10-2014-0096737
Jul. 24, 2015 (KR) .......................... 10-2015-0105325

(51) Int. Cl.
*H01M 10/0525* (2010.01)
*H01M 4/36* (2006.01)
(Continued)

(52) U.S. Cl.
CPC ............. *H01M 4/366* (2013.01); *C01B 32/20* (2017.08); *H01M 4/133* (2013.01); *H01M 4/587* (2013.01);
(Continued)

(58) Field of Classification Search
None
See application file for complete search history.

(56) References Cited

U.S. PATENT DOCUMENTS

| 6,803,150 B1 | 10/2004 | Iriyama et al. |
| 2001/0033822 A1* | 10/2001 | Ishii .................. C01B 31/04 423/448 |

(Continued)

FOREIGN PATENT DOCUMENTS

| CN | 1481041 A | 3/2004 |
| CN | 1723576 A | 1/2006 |

(Continued)

OTHER PUBLICATIONS

International Search Report from PCT/KR2015/007820, dated Nov. 6, 2015.
(Continued)

*Primary Examiner* — Tracy M Dove
(74) *Attorney, Agent, or Firm* — Lerner, David, Littenberg, Krumholz & Mentlik, LLP (57) ABSTRACT

The present disclosure relates to a secondary graphite particle comprising an initial natural graphite particle of excellent high capacity and output characteristic, aggregated, bonded or assembled with an initial artificial graphite particle of excellent cycle characteristic and swelling characteristic, thus having superior rollability that leads into increased density, a negative electrode using the secondary graphite particle as a negative electrode active material, and a secondary lithium battery comprising the negative elec- (Continued)

trode. Accordingly, the secondary lithium battery comprising the secondary graphite particle as described above as the negative electrode active material has an effect of enhanced high rate charging and discharging capability, cycle characteristic and swelling characteristic.

22 Claims, 4 Drawing Sheets (51) Int. Cl.
- *H01M 4/133* (2010.01)
- *H01M 4/587* (2010.01)
- *H01M 4/62* (2006.01)
- *C01B 32/20* (2017.01)
- *H01M 4/02* (2006.01)

(52) U.S. Cl.
CPC ....... *H01M 4/625* (2013.01); *H01M 10/0525* (2013.01); *C01P 2006/12* (2013.01); *C01P 2006/14* (2013.01); *C01P 2006/40* (2013.01); *H01M 2004/021* (2013.01); *H01M 2004/027* (2013.01)

(56) References Cited

U.S. PATENT DOCUMENTS

| | | |
|---|---|---|
| 2004/0023115 A1 | 2/2004 | Kato et al. |
| 2004/0234857 A1 | 11/2004 | Shiozaki et al. |
| 2006/0073387 A1 | 4/2006 | Sakagoshi et al. |
| 2011/0262812 A1 | 10/2011 | Han et al. |
| 2012/0074610 A1 | 3/2012 | Wu et al. |
| 2012/0135312 A1 | 5/2012 | Takahashi |
| 2012/0219863 A1 | 8/2012 | Takahashi et al. |
| 2014/0186702 A1 | 7/2014 | Takahata |
| 2014/0212750 A1 | 7/2014 | Ahn et al. |
| 2014/0227601 A1 | 8/2014 | Azami |
| 2014/0248528 A1 | 9/2014 | Takahata et al. |
| 2015/0349327 A1 | 12/2015 | Hwang et al. |

FOREIGN PATENT DOCUMENTS

| | | |
|---|---|---|
| CN | 1848489 A | 10/2006 |
| CN | 1851963 A | 10/2006 |
| CN | 102077398 A | 5/2011 |
| CN | 102231434 A | 11/2011 |
| CN | 102651468 A | 8/2012 |
| JP | H05211070 A | 8/1993 |
| JP | H06318459 A | 11/1994 |
| JP | 2001110422 A | 4/2001 |
| JP | 2005259689 A | 9/2005 |
| JP | 2005317389 A | 11/2005 |
| JP | 2008251523 A | 10/2008 |
| KR | 2001-0072967 | 7/2001 |
| KR | 20050100505 A | 10/2005 |
| KR | 20070040853 A | 4/2007 |
| KR | 20090114066 A | 11/2009 |
| KR | 20100072160 A | 6/2010 |
| KR | 20120138855 A | 12/2012 |
| KR | 101249349 B1 | 4/2013 |
| KR | 101325555 B1 | 11/2013 |
| TW | 201131871 A | 9/2011 |
| TW | 201212349 A | 3/2012 |
| WO | 2012001844 A1 | 1/2012 |
| WO | 2013008524 A1 | 1/2013 |
| WO | 2013051155 A1 | 4/2013 |
| WO | 2013125710 A1 | 8/2013 |

OTHER PUBLICATIONS

Chinese Search Report for Application No. CN201580002768.5 dated Oct. 26, 2017.

* cited by examiner

SECONDARY GRAPHITE PARTICLE AND SECONDARY LITHIUM BATTERY COMPRISING THE SAME

CROSS-REFERENCE TO RELATED APPLICATIONS

This application is a national phase entry under 35 U.S.C. § 371 of International Application No. PCT/KR2015/007820, filed Jul. 27, 2015, which claims priority to Korean Patent Application No. 10-2014-0096737, filed Jul. 29, 2014, and Korean Patent Application No. 10-2015-0105325, filed Jul. 24, 2015, the disclosures of which are incorporated herein by reference.

TECHNICAL FIELD

The present disclosure relates to a secondary graphite particle comprising an initial natural graphite particle of excellent high capacity and output characteristic, aggregated, bonded or assembled with an initial artificial graphite particle of excellent cycle characteristic and swelling characteristic, thus having superior rollability that allows increased density, a negative electrode using the secondary graphite particle as a negative electrode active material, and a secondary lithium battery comprising the negative electrode.

BACKGROUND ART

As mobile technology advances and demand for mobile devices increases, demand for the secondary batteries as energy sources increases rapidly. Among the secondary batteries, the secondary lithium battery has been widely used since its commercialization, due to excellent energy density and voltages, long cycle life, and low rate capability of self discharging.

Further, use of secondary lithium batteries as a driving source of electric vehicle and/or hybrid electric vehicle are actively researched, as environmental concern increases and the consumer's interest increases on the electric vehicles and/or hybrid electric vehicles to replace conventional vehicles run on fossil fuels such as gasoline vehicles or diesel vehicles which are one of the main causes of air pollution.

Meanwhile, the "secondary lithium battery" refers to a battery which includes an electrode assembly including a positive electrode comprising a positive electrode active material allowing intercalation/de-intercalation of lithium ions, a negative electrode comprising negative electrode active material allowing intercalation/de-intercalation of lithium ions, and a microporous separator interposed between the positive and negative electrodes, in which non-aqueous electrolyte comprising lithium ions is contained.

The positive electrode active material of the secondary lithium battery includes a transition metal oxide such as lithium cobalt oxide ($LiCoO_2$), lithium-manganese oxide ($LiMn_2O_4$) or lithium-nickel oxide ($LiNiO_2$), and a complex oxide in which part of the transition metals is substituted with other transition metals.

The lithium metal has been used for the negative electrode active material, but in such case, dendrite can form, causing risk of battery short-circuiting and subsequent explosion. Accordingly, lithium metals have recently been replaced by carbon-based materials.

Examples of the carbon-based materials used as the negative electrode active material of the secondary lithium battery include crystalline carbon such as natural graphite and artificial graphite, and amorphous carbon such as soft carbon and hard carbon.

The amorphous carbon has an advantage of high capacity, but also has a disadvantage of high irreversability in charging and discharging process.

The natural graphite, which is a representative example of crystalline carbon, has low cost, excellent initial capacity, and relatively high theoretical marginal capacity, but due to plate-like shape thereof, the natural graphite is oriented to be pressed flat on the current collector when prepared into an electrode plate, thus hindering impregnation of electrolyte, which in turn can severely deteriorate high rate charge/discharge capability, service life, and cycle capacity.

To address the issues mentioned above, it has been suggested to mechanically form the plate-shaped natural graphite into sphere shape for use, or to mix with other graphites. However, possible cracking of the graphite surface or core exposure during rolling can increase side reaction with the electrolyte, which can deteriorate cycle characteristic or swelling characteristic. To make up for the shortcomings mentioned above, some studies suggested a way of using artificial graphite which has better cycle characteristic and swelling characteristic, but at a slightly reduced capacity. However, graphitization is essentially required to use the artificial graphite, and the artificial graphite also has a shortcoming such as higher price than the natural graphite, low resistance to PC-containing electrolyte, and deteriorated output characteristic.

Against this backdrop, in search of a negative electrode active material with superior rollability which can lead into increased density, and superior high rate charging and discharging capability, cycle characteristic and swelling characteristic, the present inventors prepared a secondary graphite particle by aggregating, bonding or assembling an initial natural graphite particle coated with an amorphous carbon material, with an initial artificial graphite particle, and completed the present disclosure by confirming that the secondary lithium battery using the prepared secondary graphite particle as a negative electrode active material exhibited superior high rate charging and discharging capability, cycle characteristic and swelling characteristic.

DISCLOSURE

Technical Problem

An object of the present disclosure is to provide a secondary graphite particle which has superior rollability that can lead into increased density, as a result of aggregating, bonding or assembling of an initial natural graphite particle coated with amorphous carbon material, having high capacity and excellent output characteristic, with an initial artificial graphite particle having excellent cycle characteristic and swelling characteristic.

Another object of the present disclosure is to provide a negative electrode for use in a secondary lithium battery, in which a negative electrode active material slurry comprising the secondary graphite particle described above is applied over a current collector.

Yet another object of the present disclosure is to provide a secondary lithium battery comprising the negative electrode, the positive electrode, and a separator interposed between the negative and positive electrodes, and an electrolyte, having excellent high rate charging and discharging capability, cycle characteristic and swelling characteristic.

Technical Solution

To achieve the objects mentioned above, the present disclosure provides a secondary graphite particle formed as a result of aggregating, bonding or assembling of an initial natural graphite particle coated with amorphous carbon material, with an initial artificial graphite particle, in which by X-ray powder diffraction, the size of crystallite of the initial natural graphite particle in a-axis direction ranges from 45 nm to 55 nm, and the size of the crystallite of the initial natural graphite particle in c-axis direction ranges from 25 nm to 35 nm, and the size of the crystallite of the initial artificial graphite particle in a-axis direction ranges from 35 nm to 45 nm, and the size of the crystallite of the initial artificial graphite particle in c-axis direction ranges from 15 nm to 30 nm.

Additionally, the present disclosure provides a negative electrode for use in a secondary lithium battery, in which a negative electrode active material slurry comprising the secondary graphite particle is applied over a current collector.

Moreover, the present invention provides a secondary lithium battery which includes the negative electrode and the positive electrode for use in the secondary battery, a separator interposed between the positive electrode and the negative electrode, and an electrolyte.

Advantageous Effects

According to the present disclosure, a secondary graphite particle comprises an initial natural graphite particle exhibiting high capacity and high output characteristic but relatively lower cycle characteristic and swelling characteristic, aggregated, bonded or assembled with an initial artificial graphite particle exhibiting high cycle characteristic and swelling characteristic but relatively lower capacity characteristic, and thus can exhibit not only the high capacity and high output characteristic of the initial natural graphite particle, but also the high cycle characteristic and swelling characteristic of the initial artificial graphite particle.

Further, micropores present in the secondary graphite particle can allow higher rollability and thus can provide high density.

Accordingly, the secondary lithium battery comprising the secondary graphite particle as the negative electrode active material has an effect of enhanced high rate charging and discharging capability, cycle characteristic and swelling characteristic.

DESCRIPTION OF DRAWINGS

The following drawings accompanied in this specification are provided to exemplify preferred embodiments of the present invention, and serve to aid in understanding the scope of the present invention in conjunction with the above-described contents of the present invention. Therefore, it should be understood that the present invention is not limited to the contents shown in these drawings.

MODE FOR INVENTION

Hereinafter, the present invention will be described in further detail in order to aid in understanding the present invention.

The terms and words used in the specification and claims of the present application are not to be construed as limited to ordinary or dictionary meanings, but should be construed as meanings and concepts conforming to the technical spirit of the present invention on the basis of the principle that the inventors can suitably define the concept of the terms in order to best explain the instant invention.

The present disclosure provides a secondary graphite particle comprising an initial natural graphite particle coated with amorphous carbon material having high capacity and excellent output characteristic, aggregated, bonded or assembled with an initial artificial graphite particle having excellent cycle characteristic and swelling characteristic, thus having superior rollability that can lead into increased density and being advantageously usable as a negative electrode active material for a secondary lithium battery.

According to an exemplary embodiment of the present disclosure, the secondary graphite particle is in such a form in which an initial natural graphite particle coated with amorphous carbon material is aggregated, bonded or assembled with an initial artificial graphite particle, in which, by X-ray powder diffraction, the size of crystallite (La) of the initial natural graphite particle in a-axis direction ranges from 45 nm to 55 nm, and the size of the crystallite (Lc) in c-axis direction ranges from 25 nm to 35 nm, and the size of the crystallite of the initial artificial graphite particle in a-axis direction ranges from 35 nm to 45 nm, and the size of the crystallite of the initial artificial graphite particle in c-axis direction ranges from 15 nm to 30 nm.

The term "initial particle" as used herein may refer to an original particle from which another type of particle is formed, in which a plurality of initial particles may be aggregated, bonded or assembled into a secondary particle.

The term "secondary particle" as used herein refers to a physically distinguishable particle of a larger size which is formed as the individual initial particles are aggregated, bonded or assembled.

The term "X-ray powder diffraction" as used herein refers to X-ray diffraction (XRD) conducted with the particle (e.g., initial natural graphite particle, initial artificial graphite particle, or secondary graphite particle) in powder state.

The term "X-ray electrode diffraction" as used herein refers to X-ray diffraction (XRD) conducted with the particle (e.g., initial natural graphite particle, initial artificial graphite particle, or secondary graphite particle) prepared into an electrode state.

The term "assembly of initial particles" as used herein may refer to a process in which the initial particles are formed into the secondary particle form by voluntary or artificial coagulation or agglomeration into an assembly of a plurality of initial particles, and this term may be interchangeably used with the terms such as "aggregation" or "bonding" which have the same meaning.

According to an exemplary embodiment of the present disclosure, the "initial natural graphite particle coated with amorphous carbon material" may refer to the initial natural graphite particle in a plate form with the amorphous carbon material attached or clad on the surface thereof, and the method of attaching or cladding the surface of the initial natural graphite particle with the amorphous carbon material is not particularly limited to any specific method, but may utilize a generally known method. For example, the preparation process may involve attaching or cladding amorphous carbon material precursor on the plate-like initial natural graphite particle, followed by the heat treatment.

Specifically, for the preparation process, the plate-like initial natural graphite particle may be mixed with or impregnated in the amorphous carbon material and heated at temperatures ranging from 500 to 1500, in which the amorphous carbon material precursor material may be one or more selected from the group consisting of petroleum-derived heavy oil and pitch oil. That is, the amorphous carbon material may be derived from one or more selected from the group consisting of petroleum-derived heavy oil and pitch oil.

The amorphous carbon material may be coated in an amount exceeding 0%, but not more than 30%, as may be calculated by Equation 1 below. When the amorphous carbon material is coated in the range mentioned above, or more specifically, in a range from 1% to 5%, since irreversability of the graphite edge plane can be reduced as the amount of coated carbon increases, the characteristic of the secondary lithium battery having the above as the negative electrode active material can be enhanced. On the contrary, when the coating amount of the amorphous carbon material exceeds 30%, the amount of amorphous carbon material excessively increases compared to the natural graphite, in which case the secondary lithium battery using the same as the negative electrode active material can have inefficient charging and discharging, and since the absolute amount of the space for lithium intercalation into the negative electrode during charging decreases, the capacity of the secondary batteries can be reduced.

$$\text{Coating amount}(\%) = \frac{\text{Weight of amorphous carbon material}}{\text{Weight of initial natural graphite particle coated with amorphous carbon material}} \times 100 \quad \text{[Equation 1]}$$

The presence of the amorphous carbon material attached or clad on the surface of the initial natural graphite particle can suppress deformation of the initial natural graphite particle coated with amorphous carbon material during rolling, and also prevent direct contact between the initial natural graphite particle and the electrolyte which will be described below, thus suppressing reaction between the initial natural graphite particle and the electrolyte and enhancing cycle characteristic of the secondary lithium battery comprising the same as a negative electrode active material.

Further, when the initial natural graphite particle having a smaller average particle diameter than the sphere-type natural graphite of relatively larger average particle diameter (15 μm to 20 μm) is coated with the amorphous carbon material on the surface thereof, the coating layer can act to support the swelling phenomenon of the initial natural graphite particle cores, microscopically, that is, the secondary lithium battery having the above as the negative electrode active material can have enhanced initial swelling characteristic.

Further, the initial natural graphite particle coated with amorphous carbon material can have high crystallinity. The crystallinity may be characterized by X-ray diffraction. Specifically, as a result of measuring the powder-state initial natural graphite particle coated with amorphous carbon material, the size of the crystallite La in a-axis direction may range from 45 nm to 55 nm, and the size of the crystallite Lc in c-axis direction may range from 25 nm to 35 nm. Further, the d-spacing $d_{002}$ of (002) plane may range from 0.3355 nm to 0.3365 nm by X-ray diffraction, and the peak intensity ratio $I_{002}/I_{110}$ of (002) plane and (110) plane may range from 550 to 650 by X-ray electrode diffraction, and the peak intensity ratio $I_{004}/I_{110}$ of (004) plane and (110) plane may range from 25 to 35.

The initial natural graphite particle coated with amorphous carbon material can exhibit excellent capacity characteristic, as a result of the crystalline characteristics thereof described above, such as, the size of the crystallite in the a-axis direction, the size of the crystallite in the c-axis direction, d-spacing and/or peak intensity ratio.

Herein, the respective X-ray diffraction analysis indices characterizing the crystallinity were measured using an X-ray diffractometer, i.e., Bruker D4 Endeavor, with Cu-Kα ray, with numerical correction by Topas 3 fitting program. High purity silicon was used as an internal standard for the measurement. Calculation was done according to the Japan Society for the Promotion of Science Act (as established by the 17th Council, Japan Society for the Promotion of Science).

Further, the capacity of the initial natural graphite particle coated with amorphous carbon material may range from 355 mAh/g to 365 mAh/g. The "capacity" as used herein refers to the discharge capacity of the secondary lithium battery (half-cell) prepared using the initial natural graphite particle as the negative electrode active material.

The average particle diameter of the initial natural graphite particle coated with amorphous carbon material may range from 2 μm to 10 μm, and with the average particle diameter in such range, excellent fast chargeability or cycle characteristic can be provided.

According to an exemplary embodiment of the present disclosure, the initial artificial graphite particle may be a flat shape particle prepared by heating coal-derived heavy oil, petroleum-derived heavy oil, tar, pitch, and/or cokes at a temperature range between 500 and 3000.

Preferably, the initial artificial graphite particle may be prepared by heating one or more selected from the group consisting of needle cokes, mosaic cokes and coal tar pitch. That is, the initial artificial graphite particle may be one or more of needle coke initial artificial graphite particle, mosaic coke initial artificial graphite particle, and coal tar pitch initial artificial graphite particle, and may preferably be one or more of mosaic coke initial artificial graphite particle and coal tar pitch initial artificial graphite particle.

The coal tar pitch artificial graphite may be meso-carbon microbead (MCMB) type artificial graphite.

Further, the initial artificial graphite particle may have high crystallinity. The crystallinity may be characterized by the X-ray diffraction analysis indices. Specifically, as a result of measuring the powder state initial artificial graphite particle, the size La of the crystallite in the a-axis direction may range from 35 nm to 45 nm, the size Lc of the crystallite in the c-axis direction may range from 15 nm to 30 nm.

Further, the d-spacing $d_{002}$ of the (002) plane of the initial artificial graphite particle may range from 0.3365 nm to 0.3380 nm by X-ray diffraction. Further, by X-ray electrode diffraction, the peak intensity ratio $I_{002}/I_{110}$ of (002) plane and (110) plane may range from 50 to 150, and the peak intensity ratio $I_{004}/I_{110}$ of (004) plane and (110) plane may range from 5 to 15. Herein, the X-ray diffraction analysis indices may be measured by the same method as mentioned above.

The initial artificial graphite particle can exhibit excellent capacity characteristic and high swelling characteristic in the c-axis direction as a result of the crystalline characteristics thereof described above, such as, the size of the crystallite in the a-axis direction, the size of the crystallite in the c-axis direction, d-spacing and/or peak intensity ratio.

The capacity of the initial artificial graphite particle may range from 320 mAh/g to 340 mAh/g. The "capacity" as used herein refers to the discharge capacity of the secondary lithium battery (half-cell) prepared using the initial artificial graphite particle as the negative electrode active material.

The average particle diameter of the initial artificial graphite particle may range from 2 μm to 10 μm, and may be equal to or smaller than the initial natural graphite particle coated with amorphous carbon material. With the average particle diameter within the range mentioned above, excellent fast chargeability or cycle characteristic can be provided.

According to the present disclosure, the secondary graphite particle comprises the initial natural graphite particle coated with amorphous carbon material and the initial artificial graphite particle, and specifically, may be formed as the initial natural graphite particle coated with amorphous carbon material is aggregated, bonded or assembled with the initial artificial graphite particle into one cluster. Herein, the secondary graphite particle may include the initial natural graphite particle coated with amorphous carbon material and the initial artificial graphite particle at a weight ratio of 3:7 to 7:3 (initial natural graphite particle coated with amorphous carbon material:initial artificial graphite particle=7:3 to 3:7). Preferably, the weight ratio may be 4:6 to 6:4.

The method for aggregating, bonding or assembling the initial natural graphite particle coated with amorphous carbon material with the initial artificial graphite particle is not limited to any specific example, but may utilize a generally known method. For example, the secondary graphite particle may be prepared by the process of mixing heterogeneous initial particles with binder, catalyst, etc., and then aggregating, bonding or assembling the heterogeneous initial particles by heat treatment.

Specifically, the secondary graphite particle may be prepared by mixing the initial natural graphite particle coated with amorphous carbon material, the initial artificial graphite particle, binder and catalyst into a vacuum reactor in nitrogen or argon atmosphere, and heating at 1000 to 2800. The heat treatment at the temperature range mentioned above can remove catalyst, thus forming micropores within the final secondary graphite particle. Accordingly, the secondary graphite particle with significantly low fault and high crystallinity can be obtained. That is, heating at a temperature below 1000 may not provide successful graphitization, which may hinder exhibiting of capacity, and beyond 2800, swelling characteristic may deteriorate. Accordingly, heat treatment may preferably be performed at a range of 1000 to 2800, if possible.

The total pore volume of the secondary graphite particle may range from 3 cm$^3$/g to 30 cm$^3$/g, and the specific surface area may range from 1 m$^2$/g to 10 m$^2$/g. Accordingly, the secondary lithium battery using the secondary graphite particle having such specific surface area and/or pore volume can ensure a structure with more pores within the negative electrode, thus can provide enhanced input and output characteristic as well as enhanced swelling characteristic, or enhanced charging and discharging capacity characteristic.

The binder may use, for example, petroleum, coal, artificial pitch, tar, or the like, although not specifically limited thereto.

The catalyst may use carbide, oxide or nitride such as silicon, iron, nickel, titanium, boron, etc., in an amount of 1 wt % to 50 wt % over 100 wt % as a total weight of the initial particles and the binder, although not specifically limited thereto.

Further, the secondary graphite particle according to the present disclosure may preferably be in a sphere shape with an aspect ratio ranging from 1 to 1.5. If the negative electrode is prepared with the negative electrode active material having the secondary graphite particle with an aspect ratio exceeding the range mentioned above, problems such as deformation, elongation or fracture of the current collector can occur, thus deteriorating high density of the active material layer. Further, when the secondary graphite particle has an aspect ratio considerably out of the sphere shape, i.e, out of the range mentioned above, the orientation in the c-axis direction can increase, which can deteriorate swelling characteristic of the secondary lithium battery having the secondary graphite particle as the negative electrode active material. Further, a negative electrode prepared with the negative electrode active material comprising such secondary graphite particle can give negative effect on the large pore distribution, which will also eventually lead into deteriorated input and output characteristic of the secondary lithium battery having the secondary graphite particle.

The average particle diameter of the secondary graphite particle may range from 10 μm to 30 μm, and the peak intensity ratio $I_{002}/I_{110}$ of (002) plane and (110) plane may range from 200 to 400, and the peak intensity ratio $I_{004}/I_{110}$ of (004) plane and (110) plane may range from 10 to 25. The peak intensity ratio may be obtained by the X-ray diffraction which may be performed in the same manner as described above.

According to the present disclosure, the secondary graphite particle comprises the initial natural graphite particle coated with amorphous carbon material of high capacity and high output, and the initial artificial graphite particle of high cycle characteristic and excellent swelling characteristic, and can thus exhibit not only high capacity and high output characteristic, but also excellent cycle characteristic and swelling characteristic. Furthermore, when the secondary graphite particle is used as the negative electrode active material, the micropores present within the secondary graphite particle can act as a buffer, which can thus provide stronger rollability compared to the negative electrode active material comprising a simple mixture of heterogeneous graphite, against deformation or decomposition during relatively strong rolling, and as a result, provide high density active material layer.

As described above, the secondary graphite particle according to the present disclosure may be included in the negative electrode active material for use in the secondary battery, and a method for preparing the negative electrode active material may be summarized as follows.

First, the method of preparing the secondary graphite particle may include a process of: preparing an initial natural graphite particle coated with amorphous carbon material by mixing an amorphous carbon material precursor with an initial natural graphite particle and heating the same; graphitizing, by heating one or more selected from the group consisting of coal-derived heavy oil, petroleum-derived heavy oil, tar, pitch and cokes at 500 to 3000° C. into a powder state, initial artificial graphite particle; mixing the initial natural graphite particle coated with amorphous carbon material, the initial artificial graphite particle, a binder and a catalyst; and heating at 1000 to 2800° C.

Meanwhile, a method for preparing a negative electrode active material comprising the secondary graphite particle according to the present disclosure is not limited to any specific example only, but other methods may be applied. For one example, the method for preparing a secondary graphite particle may include steps of: assembling a secondary particle by mixing an initial natural graphite particle and a soft carbon particle; and graphitizing the assembled secondary particle into a powder state, by heating at 3000 to 3200° C.

In other words, the negative electrode active material comprising the secondary graphite particle prepared by the two methods exemplified above can exhibit excellent capacity characteristic as a result of the crystalline characteristic of the constituent materials, i.e., the initial natural graphite particle coated with amorphous carbon material and the initial artificial graphite particle, and the secondary graphite particle as described above, and it is thus possible to provide a secondary battery with enhanced swelling characteristic.

Additionally, the present disclosure provides a negative electrode for use in a secondary battery, in which a negative electrode active material slurry comprising the secondary graphite particle for use in a secondary lithium battery is applied over a current collector.

According to an exemplary embodiment of the present disclosure, the negative electrode may be prepared by applying a negative electrode active material comprising the secondary graphite particle on a negative electrode current collector, drying and rolling the same.

The negative electrode current collector may generally have a thickness ranging from 3 µm to 500 µm, and its type is not particularly limited as long as it exhibits high conductivity without causing a chemical change in the battery concerned. For example, copper, stainless steel, aluminum, nickel, titanium, calcined carbon, or aluminum or stainless steel surface-treated with carbon, nickel, titanium, or silver may be used as the electrode current collector.

The negative electrode active material may be prepared by adding to the secondary graphite particle an additive such as a binder, a conductor, a filler, etc., and mixing the same. Further, a dispersant may be additionally added during organic material mixing.

The binder is an ingredient that helps to bind the secondary graphite particle with the conductor, and to the current collector, which may generally be added in an amount of 1 wt % to 30 wt % over 100 wt % as a total weight of the secondary graphite particle. While any binder generally known in the art may be used, an example may include a mixture of one or more, or two or more selected from the group consisting of vinylidene fluoride-hexafluoropropylene copolymer (PVBF-co-HEP), polyvinylidene fluoride, polyacrylonitrile, polymethaylmethacrylate, polyvinyl alcohol, carboxymethyl cellulose (CMC), starch, hydroxyproylcellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene-butylene rubber (SBR) and fluorine rubber, and specifically, a mixture of carboxymethyl cellulose (CMC) and styrene-butylene rubber (SBR).

The conductor may generally be added in an amount of 0.05 wt % to 5 wt % over 100 wt % as a total weight of the secondary graphite particle. The conductor is not particularly limited as long as it exhibits conductivity without causing a side reaction with other elements of the battery. For example, graphite such as natural graphite or artificial graphite; carbon black such as carbon black (super-p), acetylene black, Ketjen black, channel black, furnace black, lamp black, and thermal black; a conductive fiber such as a carbon fiber or a metal fiber; a metal powder such as fluorocarbon, aluminum, or nickel powder; a conductive whisker such as zinc oxide or potassium titanate; a conductive metal oxide such as titanium oxide; or a conductive material such as polyphenylene derivatives, may be used as the conductive agent.

The filler is an ingredient for suppressing the expansion of an electrode, and whether or not to use the filler may be determined according to need. The type of filler is not particularly limited as long as it is a fibrous material that does not cause a chemical change in the battery concerned. For example, an olefin polymer such as polyethylene or polypropylene; or a fibrous material, such as glass fiber or carbon fiber, may be used as the filler.

The dispersant (dispersion) is not limited to any specific example, but may be isopropyl alcohol, N-methylpyrrolidone (NMP), or acetone, for example.

The method of applying is not particularly limited but may be carried out using a method well known in the art, for example, by distributing the negative electrode active material over the negative electrode current collector and thereafter evenly dispersing the same using a doctor blade, etc. Besides, a method such as die casting, comma coating, or screen printing may be used to carry out the applying.

The method of drying is not particularly limited but may be carried out in a 50 to 200 vacuum oven within 1 day.

Moreover, the present invention provides a secondary lithium battery which includes a positive electrode, a negative electrode, a separator interposed between the positive electrode and the negative electrode, and an electrolyte.

According to an exemplary embodiment of the present disclosure, the secondary lithium battery may include a negative electrode applied with a negative electrode active material comprising a secondary graphite particle which is formed as a result of aggregation, bonding or assembly of an initial natural graphite particle coated with amorphous carbon material with an initial artificial graphite particle, a positive electrode, a separator interposed between the negative electrode and the positive electrode, and an electrolyte.

The positive electrode may be prepared by applying a positive electrode active material on one upper surface of a positive electrode current collector and drying the same, in which the positive electrode active material may contain an additive such as a binder, a conductor, a filler and a dispersant.

The positive electrode current collector may be same as the negative electrode current collector mentioned above, or included therein.

The additive such as binder, conductor, filler or dispersant used for the positive electrode may be same as those used for the preparation of the negative electrode mentioned above, or may be included therein.

While any known positive electrode active material may be used without limiting, an example of the positive electrode active material may be a compound comprising lithium intercalation material as a main ingredient, such as a layered compound such as lithium cobalt oxide ($LiCoO_2$) or lithium nickel oxide ($LiNiO_2$), or a compound substituted with one or more transition metals; lithium manganese oxide ($LiMnO_2$); lithium copper oxide ($Li_2CuO_2$); vanadium oxide; in situ lithiated nickel oxide; lithium manganese complex oxide, desulfide compound or a complex oxide formed by a combination thereof.

The separator may be an electrically insulating thin film having high ion permeability and mechanical strength, and may generally have a pore diameter ranging from 0.01 μm to 10 μm and a thickness ranging from 5 μm to 300 μm. For such a separator, a porous polymer film, for example, a porous polymer film which is manufactured from a polyolefin polymer, such as ethylene homopolymer, propylene homopolymer, ethylene/butene copolymer, ethylene/hexene copolymer, and ethylene/methacrylate copolymer, may be used either alone or as a laminate. Alternatively, a common porous nonwoven fabric, for example, a nonwoven fabric made of a glass fiber with a high melting point, polyethylene terephthalate fiber, or the like, may be used. However, the type of separator is not limited to these examples.

In addition, the electrolyte may include an organic solvent and a lithium salt that are commonly used in electrolytes, but not specifically limited thereto.

The negative ion of the lithium salt may be one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3CO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent may be one or more selected from the group consisting of: propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran.

Particularly, among the carbonate based organic solvents, ethylene carbonate and propylene carbonate, which are cyclic carbonates, may preferably be used, as they are organic solvents of high viscosity and have a high dielectric constant and thus effectively dissociate lithium salts in an electrolyte. More preferably, such a cyclic carbonate, dimethyl carbonate, and a linear carbonate of low viscosity and low dielectric constant, such as diethyl carbonate, may be used as they can be mixed at a suitable ratio to make an electrolyte having high electric conductivity.

In addition, the electrolyte may additionally include pyridine, triethyl phosphate, triethanolamine, cyclic ethers, ethylenediamine, n-glyme, hexaphosphoric acid triamide, nitrobenzene derivatives, sulfur, quinoneimine dye, N-substituted oxazolidinone, N,N-substituted imidazolidine, ethylene glycol dialkyl ethers, ammonium salts, pyrrole, 2-methoxyethanol, trichloroaluminium, etc. as needed, in order to improve charging and discharging characteristics, flame resistance, etc. In some cases, the electrolyte may additionally include a halogen-containing solvent, such as carbon tetrachloride or trifluoroethylene, to achieve non-flammability; carbon dioxide gas to improve high-temperature storage characteristics; or fluoroethylene carbonate (FEC), propene sulfone (PRS), fluoropropylene carbonate (FPC), or the like.

The secondary lithium battery according to the present disclosure may be manufactured by forming an electrode assembly in which a separator is interposed between a positive electrode and a negative electrode, followed by inserting the electrode assembly into a cylindrical or angular shape battery case and then injecting an electrolyte. Alternatively, the battery may be manufactured by impregnating the electrode assembly with an electrolyte, following the lamination of the electrode assembly, and thereafter inserting the resulting product into a battery case and sealing the case.

The battery case used in the present disclosure may be any of those typically used in the art. The outer shape of the battery case is not particularly limited according to the use of the battery, but may be, for example, a cylindrical shape using a can, an angular shape, a pouch-like shape, or a coin-like shape.

The lithium secondary battery according to the present disclosure may be used not only for a battery cell which is used as a power source for small devices, but also as a unit cell in a medium-to-large battery module comprising multiple battery cells. Suitable examples of the medium-to-large device include, but are not limited to, electric vehicles, hybrid electric vehicles, plug-in hybrid electric vehicles, power storage systems, etc.

EXAMPLES

Hereinafter, the present disclosure will be described in further detail using the following examples and experimental example. However, the following examples and experimental example are provided only to exemplify the present invention, and thus the scope of the present invention is not limited to these examples.

Preparation Example 1

A mixture was prepared, including therein 50 wt % of initial natural graphite particle coated with amorphous carbon material (in which crystallite size in a-axis direction is 50 nm, crystallite size in c-axis direction is 30 nm, d-spacing $d_{002}$ of (002) plane is 0.3360 nm, and particle diameter is 5 μm) (coating amount: 2%), and 50 wt % of initial artificial graphite particle (in which crystallite size in a-axis direction is 30 nm, crystallite size in c-axis direction is 20 nm, d-spacing $d_{002}$ of (002) plane is 0.3370 nm, and particle diameter is 5 μm). The mixture was then added with the binder and the catalyst, and heated at 2800 under nitrogen atmosphere. As a result, the secondary graphite particle was prepared. For the initial artificial graphite particle, cokes artificial graphite was used.

A negative electrode active material slurry was prepared by mixing 96 wt % of the prepared secondary graphite particle with 1 wt % of carbon black conductor, 1.5 wt % of carboxymethyl cellulose (CMC), and 1.5 wt % of styrene-butadiene rubber (SBR), and then applied onto copper foil to 150 μm of thickness. After rolling and drying, negative electrode was prepared.

Preparation Example 2

The secondary graphite particle was prepared and the negative electrode was prepared with almost the same method as described above with reference to Preparation Example 1, except for using mosaic artificial graphite for the initial artificial graphite particle.

Preparation Example 3

The secondary graphite particle was prepared and the negative electrode was prepared with almost the same method as described above with reference to Preparation Example 1, except for using MCMB type artificial graphite for the initial artificial graphite particle.

Comparative Preparation Example 1

The negative electrode was prepared with almost the same method as described above with reference to Preparation Example 1, except for using a mixture of natural graphite coated with amorphous carbon material and artificial graphite at a 5:5 weight ratio, instead of the secondary graphite particle.

Comparative Preparation Example 2

The negative electrode was prepared with almost the same method as described above with reference to Preparation Example 1, except for preparing the secondary graphite particle with a plurality of initial artificial graphite particles (single material) instead of the initial natural graphite particle coated with amorphous carbon material.

Preparation Example 4

The secondary graphite particle was prepared and the negative electrode was prepared with almost the same method as described above with reference to Preparation Example 1, except for setting heating at 2500° C.

Comparative Preparation Example 3

The secondary graphite particle was prepared and the negative electrode was prepared with almost the same method as described above with reference to Preparation Example 1, except for setting heating at 800° C.

Comparative Preparation Example 4

The secondary graphite particle was prepared and the negative electrode was prepared with almost the same method as described above with reference to Preparation Example 1, except for setting heating at 3000° C.

Example 1

1) Preparation of Coin-Type Half Cell

After punching out the counter electrode (lithium metal foil was used as the counter electrode) and the negative electrode prepared at Preparation Example 1-1 and building into a coin shape, 1 mol/$LiPF_6$ carbonate electrolyte with 2 wt % vinyl chloride (VC) dissolved therein was injected to form a coin-type half cell.

2) Preparation of Monocell

The positive electrode active material slurry was prepared by mixing 96 wt % $LiCoO_2$, 2 wt % carbon black, and 2 wt % polyfluorovinylidene as the positive electrode active materials, and further adding N-methyl-2-pyrrolidone (NMP) and mixing the same, and the positive electrode was prepared by applying the prepared positive electrode active material slurry onto an aluminum foil to a 130 μm thickness, and performing rolling and drying.

After punching out the positive electrode and the negative electrode prepared at Preparation Example 1 to a 34 $cm^2$ size, 1 mol/$LiPF_6$ carbonate electrolyte with 2 wt % vinyl chloride (VC) dissolved therein was injected to form a polymer cell-type monocell.

Example 2

A coin-type half cell and a monocell were prepared in the same manner as Example 1-1 described above, except for a difference of using the negative electrode prepared at Preparation Example 2 as a negative electrode.

Example 3

A coin-type half cell and a monocell were prepared in the same manner as Example 1-1 described above, except for a difference of using the negative electrode prepared at Preparation Example 3 as a negative electrode.

Comparative Example 1

A coin-type half cell and a monocell were prepared in the same manner as Example 1-1 described above, except for a difference of using the negative electrode prepared at Comparative Preparation Example 1 as a negative electrode.

Comparative Example 2

A coin-type half cell and a monocell were prepared in the same manner as Example 1-1 described above, except for a difference of using the negative electrode prepared at Comparative Preparation Example 2 as a negative electrode.

Example 4

A coin-type half cell and a monocell were prepared in the same manner as Example 1-1 described above, except for a difference of using the negative electrode prepared at Preparation Example 4 as a negative electrode.

Comparative Example 3

A coin-type half cell and a monocell were prepared in the same manner as Example 1-1 described above, except for a difference of using the negative electrode prepared at Comparative Preparation Example 3 as a negative electrode.

Comparative Example 4

A coin-type half cell and a monocell were prepared in the same manner as Example 1-1 described above, except for a difference of using the negative electrode prepared at Comparative Preparation Example 4 as a negative electrode.

Experimental Example 1: Swelling Characteristic Evaluation Based on Materials

The swelling characteristics of the coin-type half cells prepared at Examples 1 to 3 and Comparative Examples 1 and 2 were compared and analyzed. The thicknesses of the respective cells were measured with real-time thickness measurement equipment. The results are shown in FIG. 1.

Figure 1:
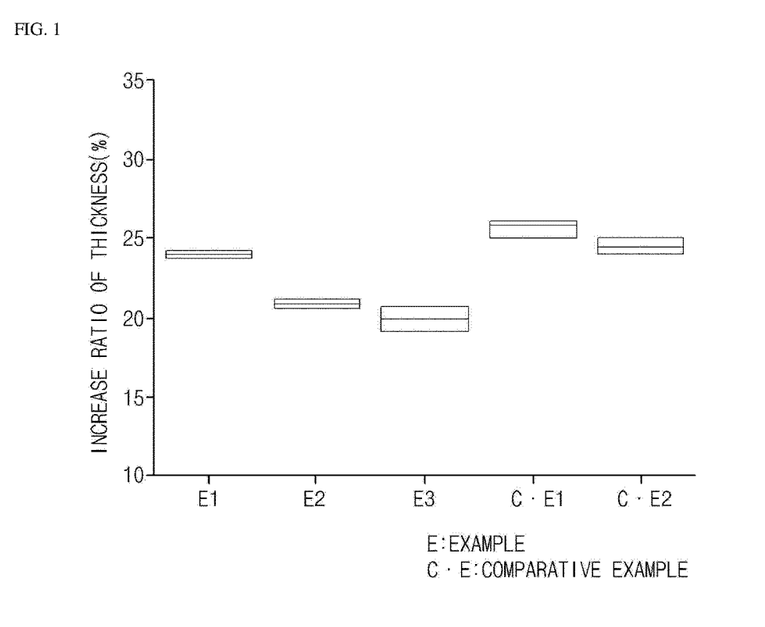
FIG. 1 is a graphical representation of a result of comparing swelling characteristic of coin-type half cells based on materials thereof, according to an exemplary embodiment of the present disclosure.

As shown in FIG. 1, it was observed that, overall, the coin-type half cells of Examples 1 to 3 prepared with the negative electrode comprising the secondary graphite particle according to the present disclosure as its negative electrode active material exhibited superior swelling characteristic compared to the coin-type half cells of Comparative Examples 1 and 2.

In particular, among the artificial graphites, the coin-type half cell of Example 2 using the mosaic artificial graphite and the coin-type half cell of Example 3 using the MCMB type artificial graphite exhibited significantly enhanced swelling characteristic, compared to the coin-type half cell of Comparative Example 1 which used simple method of mixing the initial particles or to the coin-type half cell of Comparative Example 2 which used the secondary graphite particle prepared with a plurality of homogeneous initial artificial graphite particles.

Experimental Example 2: Swelling Characteristic Evaluation Based on Heating Temperature The swelling characteristics of the coin-type half cells prepared at Example 4 and Comparative Examples 3 and 4 were compared and analyzed. The thicknesses of the respective cells were measured with real-time thickness measurement equipment. The results are shown in FIG. 4.

Figure 4:
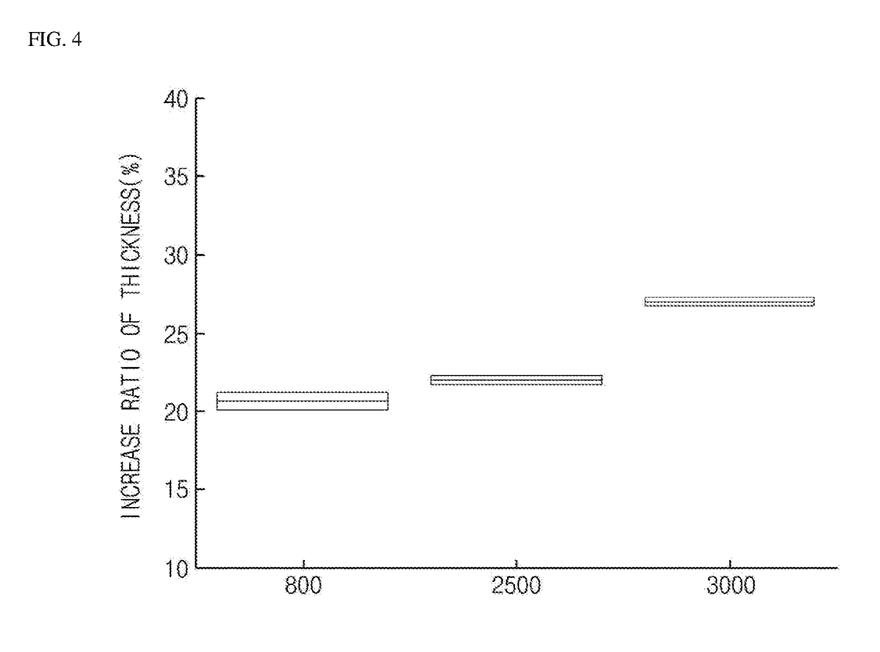
FIG. 4 is a graphical representation of a result of comparing swelling characteristic of coin-type half cells based on temperatures of heat treatment thereof, according to an exemplary embodiment of the present disclosure.

As shown in FIG. 4, it was observed that, overall, the coin-type half cell of Example 4 prepared with the negative electrode comprising the secondary graphite particle according to the present disclosure as its negative electrode active material exhibited superior swelling characteristic compared to the coin-type half cells of Comparative Examples 3 and 4.

That is, it was confirmed that heat treatment set at an approximate temperature range from 1000 to 2800° C. resulted better swelling characteristic, while the swelling characteristic deteriorated outside such temperature range.

Experimental Example 3: Capacity Characteristic Evaluation

The capacity characteristics of the coin-type half cells prepared at Examples 1 to 3 and Comparative Examples 1 and 2 were compared and analyzed.

After charging each cell at 25, at a rate of 0.1 C by CC/CV and then discharging down to 1.5 V at a rate of 0.1 C by CC, charging and discharging capacities were measured. The charging and discharging efficiency and discharge rate characteristic were analyzed based on the same. The results are shown in FIG. 2.

Figure 2:
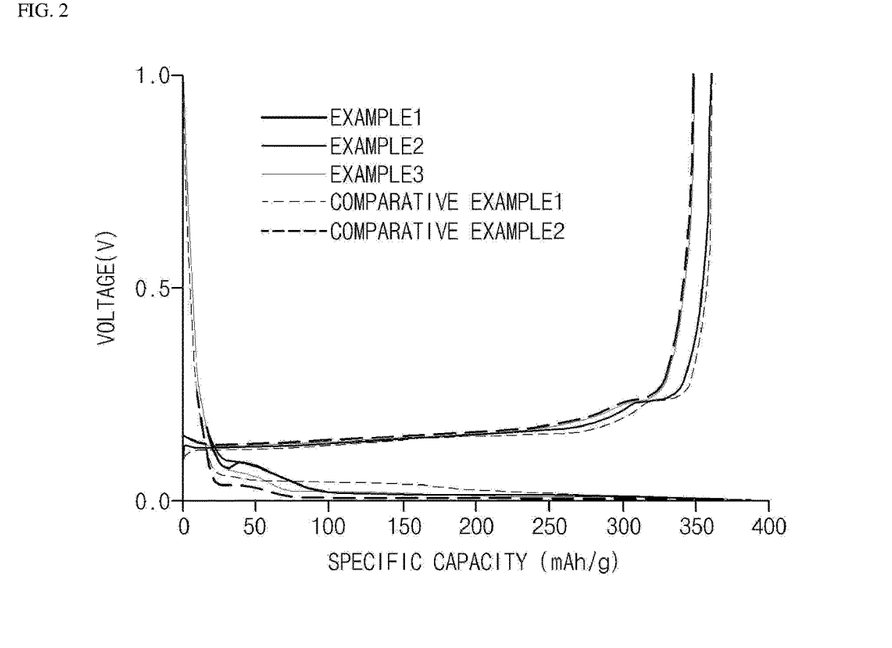
FIG. 2 is a graphical representation of a result of comparing capacity characteristic of coin-type half cells, according to an exemplary embodiment of the present disclosure.

As shown in FIG. 2, it was observed that, overall, the coin-type half cells of Examples 1 to 3 prepared with the negative electrode comprising the secondary graphite particle according to the present disclosure as its negative electrode active material exhibited a bit higher or similar capacity characteristic with respect to the coin-type half cells of Comparative Examples 1 and 2.

Experimental Example 4: Cycle Characteristic Evaluation

The input and output characteristics of the monocells prepared at Examples 1 to 3 and Comparative Examples 1 and 2 were compared and analyzed.

Each of the monocells at 25 were repeatedly charged and discharged in sequence of charging and discharging condition of 0.2 C/0.2 C, 0.2 C/0.5 C, 0.2 C/1.0 C, 0.2 C/2.0 C, and capacity retention ratio was analyzed based on the charge-discharge rate. The results are shown in FIG. 3.

Figure 3:
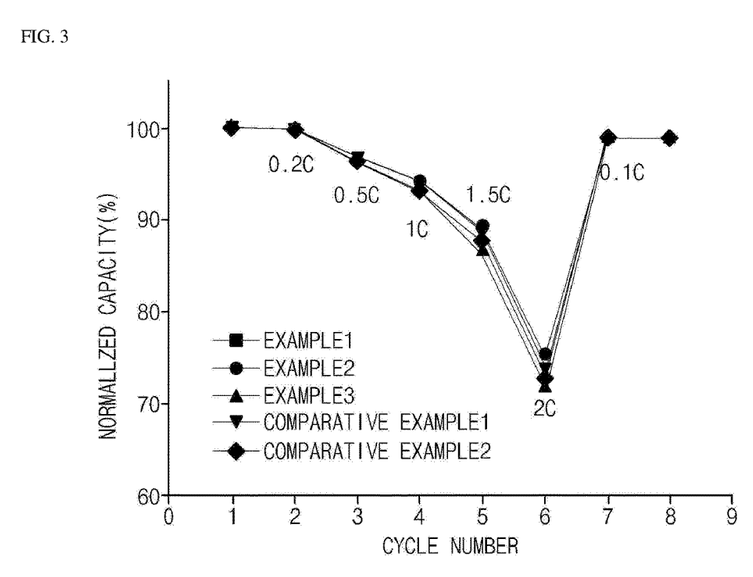
FIG. 3 is a graphical representation of a result of comparing input/output characteristic of monocells, according to an exemplary embodiment of the present disclosure.

As shown in FIG. 3, it was observed that, overall, the monocells of Examples 1 to 3 prepared with the negative electrode comprising the secondary graphite particle according to the present disclosure as its negative electrode active material exhibited rather higher capacity retention ratio compared to the monocells of Comparative Examples 1 and 2.

What is claimed is:
1. A negative electrode active material, comprising:
a secondary graphite particle assembled with a primary natural graphite particle coated with amorphous carbon material, and a primary artificial graphite particle,
wherein, by X-ray powder diffraction, a size of a crystallite of the initial natural graphite particle in an a-axis direction ranges from 45 nm to 55 nm, and a size of a crystallite of the initial natural graphite particle in a c-axis direction ranges from 25 nm to 35 nm,
and a size of a crystallite of the initial artificial graphite particle in an a-axis direction ranges from 35 nm to 45 nm, and a size of a crystallite of the initial artificial graphite particle in a c-axis direction ranges from 15 nm to 30 nm,
wherein the secondary graphite particle has a total pore volume from 3 to 30 cm$^3$/g.
2. The negative electrode active material as set forth in claim 1, wherein the secondary graphite particle has a specific surface area from 1 to 10 m$^2$/g.
3. The negative electrode active material as set forth in claim 1, wherein the primary natural graphite particle has a capacity from 355 to 365 mAh/g.
4. The negative electrode active material as set forth in claim 1, wherein the primary natural graphite particle has a d-spacing $d_{002}$ of (002) plane from 0.3355 nm to 0.3365 nm, by X-ray powder diffraction.
5. The negative electrode active material as set forth in claim 1, wherein, by X-ray electrode diffraction, the primary natural graphite particle has a peak intensity ratio $I_{002}/I_{1110}$ of (002) plane and (110) plane from 550 to 650, and a peak intensity ratio $I_{004}/I_{110}$ of (004) plane and (110) plane from 25 to 35.
6. The negative electrode active material as set forth in claim 1, wherein the primary natural graphite particle has an average particle diameter from 2 to 10 μm.
7. The negative electrode active material as set forth in claim 1, wherein the artificial graphite is one or more selected from the group consisting of needle cokes artificial graphite, mosaic cokes artificial graphite, and meso-carbon microbead (MCMB) type artificial graphite.
8. The negative electrode active material as set forth in claim 1, wherein the artificial graphite is one or more selected from the group consisting of mosaic cokes artificial graphite and MCMB type artificial graphite.
9. The negative electrode active material as set forth in claim 1, wherein the primary artificial graphite particle has a capacity from 320 to 340 mAh/g.
10. The negative electrode active material as set forth in claim 1, wherein the primary artificial graphite particle has a d-spacing $d_{002}$ of (002) plane from 0.3365 to 0.3380 nm, by X-ray powder diffraction.
11. The negative electrode active material as set forth in claim 1, wherein, by X-ray electrode diffraction, the primary artificial graphite particle has a peak intensity ratio $I_{002}/I_{110}$ of (002) plane and (110) plane from 50 to 150, and a peak intensity ratio $I_{004}/I_{110}$ of (004) plane and (110) plane from 5 to 15.
12. The negative electrode active material as set forth in claim 1, wherein the primary artificial graphite particle has an average particle diameter from 2 to 10 μm.
13. The negative electrode active material as set forth in claim 1, wherein the secondary graphite particle has an average particle diameter from 10 to 30 μm.
14. The negative electrode active material as set forth in claim 1, wherein the secondary graphite particle has an aspect ratio from 1 to 1.5.

15. The negative electrode active material as set forth in claim 1, wherein, by X-ray electrode diffraction, the secondary graphite particle has a peak intensity ratio $I_{002}/I_{110}$ of (002) plane and (110) plane from 200 to 400, and a peak intensity ratio $I_{004}/I_{110}$ of (004) plane and (110) plane from 10 to 25.

16. A method of preparing the negative electrode active material of claim 1, comprising steps of:
   mixing an amorphous carbon precursor with the primary natural graphite particle and heating the same to prepare the primary natural graphite particle coated with amorphous carbon material;
   preparing the primary artificial graphite particle by powder graphitizing one or more selected from the group consisting of coal-derived heavy oil, petroleum-derived heavy oil, tar, pitch, and cokes, by heating at 500 to 3000° C.;
   mixing the primary natural graphite particle coated with amorphous carbon material, the initial artificial graphite particle, a binder and a catalyst; and
   heating at 1000 to 2800° C. to prepare the secondary graphite particle.

17. The method as set forth in claim 16, wherein the amorphous carbon material is prepared with one or more selected from the group consisting of a petroleum-derived heavy oil and a pitch oil.

18. The method as set forth in claim 16, wherein an amount of the amorphous carbon material coated on the initial natural graphite particle is above 0% but not more than 30%.

19. The method as set forth in claim 16, wherein the secondary graphite particle includes the primary natural graphite particle coated with amorphous carbon material and the initial artificial graphite particle at a weight ratio of 3:7 to 7:3.

20. A method of preparing the negative electrode active material of claim 1, comprising steps of:
   mixing the primary natural graphite particle and a soft carbon particle to assemble both particles into a secondary particle; and
   preparing the secondary graphite particle by powder graphitizing the assembled secondary particle by heating at 3000 to 3200° C.

21. A negative electrode for use in a secondary battery, wherein a negative electrode slurry comprising the negative electrode active material as set forth in claim 1 is applied over a current collector.

22. A secondary lithium battery comprising a negative electrode and a positive electrode for use in the secondary battery as set forth in claim 21, a separator interposed between the negative electrode and the positive electrode, and an electrolyte.

* * * * *